United States Patent Office 3,651,143
Patented Mar. 21, 1972

3,651,143
AMINO AND SUBSTITUTED AMINO CONTAINING
BENZOCYCLOHEPTENONES
Eugene E. Galantay, Morristown, N.J., assignor to
Sandoz-Wander, Inc., Hanover, N.J.
No Drawing. Filed Feb. 4, 1969, Ser. No. 796,567
Int. Cl. C07c 87/64
U.S. Cl. 260—575    4 Claims

ABSTRACT OF THE DISCLOSURE

The compounds are 6-amino- and substituted amino-5H-benzocyclohepten-5-ones, which may be substituted or unsubstituted at the aromatic moiety, e.g., 6-amino-5H-benzocyclohepten-5-one, and are useful as hypnotic-sedative agents.

---

This invention relates to benzocycloheptenones and more particularly, to certain 6-amino and substituted amino-5H-benzocyclohepten-5-ones and their non-toxic pharmaceutically acceptable acid addition salts, and to methods for preparing such compounds, as well as to compositions containing such compounds and to the use of such compositions.

The 6-amino and substituted amino-5H-benzocyclohepten-5-ones of the present invention, i.e. compound I, may be represented structurally as follows:

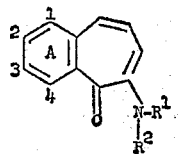

wherein each of $R^1$ and $R^2$ is, independently, a hydrogen atom or lower alkyl; and ring A is unsubstituted or is mono-substituted at the 1-position by a halogen atom; at the 2-position by lower alkoxy; or at the 3-position by any of a halogen atom, nitro or

di-substituted at the 2- and 3-positions by lower alkoxy; or,
tri-substituted at the 2- and 3-positions by lower alkoxy and at the 4-position by either lower alkoxy or hydroxy, wherein $R^3$ is a hydrogen atom or lower alkyl; and
$R^4$ is a hydrogen atom, lower alkyl or lower alkanoyl.

In the above definitions the term halogen atom refers to a halogen atom having an atomic weight of 35 to 80 i.e. chlorine or bromine; the term lower alkoxy refers to alkoxy having from 1 to 2 carbon atoms, i.e. methoxy or ethoxy; the term lower alkyl refers to alkyl having for example from 1 to 4 carbon atoms and particularly unbranched alkyl, especially methyl; the term lower alkanoyl refers to alkanoyl having for example from 2 to 4 carbon atoms, particularly unbranched alkanoyl, especially acetyl.

Compounds I are conveniently prepared by reaction of an appropriate 6-hydroxy or -alkoxy-5H-benzocyclohepten-5-one, i.e. a compound II, with an appropriate ammonium alkanoylate (III), which may conveniently be represented by the following reaction scheme, wherein $R^1$, $R^2$ and ring A are as defined above and $R^6$ is lower alkyl, e.g., having 1 to 4 carbon atoms, particularly methyl and $R^5$ is a hydrogen atom or alkyl, e.g., having from 1 to 4 carbon atoms, particularly methyl.

REACTION SCHEME

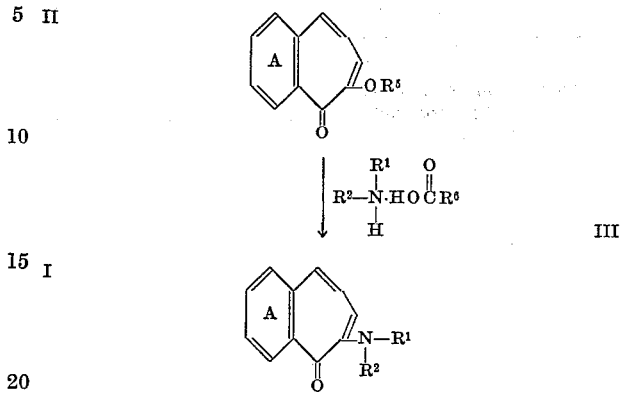

The above-described reaction may be carried out by intimately contacting the reactants, i.e. compounds II and III, at a temperature of from about 100° C. to 250° C. for a period of time sufficient to convert a significant amount of compound II to compound I, e.g., from about 30 minutes to 5 hours. The reaction may be carried out in the presence of an inert solvent, which is liquid under the reaction conditions, e.g., diglyme or dimethyl acetamide, but is preferably carried out in the absence of solvent by holding the reaction mixture in a molten state.

Compounds II are known and may be prepared by methods described in the literature, or where not known, they may be prepared by methods analogous to that described in the literature. For example, the preparation of $\alpha,\beta$-benzotropolone, i.e. 6-hydroxy-5H-benzocyclohepten-5-one, is described in the Journal of the Chemistry Society 1952, 603 to 607.

Compounds I are useful because they have pharmacological activity. In particular, they are useful as hypnotic-sedative agents as indicated by behavioral tests in white mice (Irwin, S:, Gordon Research Conference, Medicinal Chemistry, 1959, and Chen; Symposium on Sedative and Hypnotic Drugs, Williams and Wilkins, 1954), and "rotarod" test (Dunham, N. W. and Miya, T. S.; J. Am. Pharm. Assoc., 46:208, 1957) on white mice. For such use the compounds are administered orally or parenterally in daily doses of from about 0.75 milligrams to 300 milligrams per kilogram of animal body weight, preferably given in divided doses 2 to 4 times a day or in sustained release form. For large mammals the total oral daily dosage is from about 50 milligrams to 750 milligrams. Dosage forms suitable for oral administration comprise from about 10 milligrams to 200 milligrams of active compound in intimate admixture with a solid or liquid pharmaceutically acceptable carrier or diluent.

For the above uses, the compounds may be combined with a pharmaceutically acceptable carrier, and such other conventional adjuvants, as may be necessary, and administered orally in such forms as tablets, capsules, elixirs, suspensions or solutions, or parenterally in such forms as injectable solutions, suspensions or emulsions. Furthermore, the compounds may be similarly administered in the form of their non-toxic pharmaceutically acceptable acid addition salts. Such salts possess the same order of activity as the free base, are readily prepared in conventional manner by reacting the base with the appropriate acid and accordingly are included within the scope of the invention. Representative of such salts are the mineral acid salts such as the hydrochloride, hydrobromide, sulphate, phosphate and the like and the organic acid salts such as the succinate, benzoate, acetate, maleate, p-toluenesulfonate, benzenesulfonate and the like.

For example, each of the pharmaceutically active compounds of this invention may be incorporated, for oral administration, in a tablet as the sole active ingredient. A typical tablet is constituted by from 1 to 3 percent binder, e.g., tragacanth; from 3 to 10 percent disintegrating agent, e.g., corn starch; from 2 to 10 percent lubricant, e.g., talcum; from 0.25 to 1.0 percent lubricant, e.g., magnesium stearate; and average dosage of active ingredient; and q.s. 100 percent of filler, e.g., lactose; all percentages being by weight. Tablets are prepared according to standard tabletting techniques, which are well-known in the art, employing the necessary amounts of conventional granulating liquids, e.g., alcohol SD-30 and purified water. An exemplary tabletting formulation for the instant active compounds is:

| Ingredient: | Parts by weight |
|---|---|
| 6-amino-5H-benzocyclohepten-5-one | 5 |
| Tragacanth | 2 |
| Lactose | 84.5 |
| Corn starch | 5 |
| Talcum | 3 |
| Magnesium stearate | 0.5 |
| Alcohol SD-30, purified water, q.s. | |

The following examples are presented as illustrative of the compounds of this invention and the method in which such compounds may be prepared, and are not intended as in any way limiting the scope of this invention. All temperatures given herein are centigrade and room temperature is 25° C., unless indicated otherwise.

EXAMPLE 1

6-amino-5H-benzocyclohepten-5-one

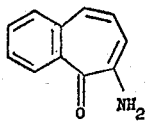

12 g. of 6-hydroxy-5H-benzocyclohepten-5-one and 50 g. of ammonium acetate (both finely divided) are intimately admixed and heated to about 125° (resulting in a molten mass), and maintained at such temperature for 1 hour. The reaction mixture is then allowed to cool to room temperature, 100 ml. of chloroform is mixed therewith, and the mixture washed with water (thrice with 30 ml. portions). The chloroform layer is dried over anhydrous sodium sulphate, then evaporated (under vacuum) to obtain a residue of crude 6-amino-5H-benzocyclohepten-5-one. The crude product is refined by vacuum distillation (200° bath temperature, 0.1 mm.) followed by recrystallization of the distillate from chloroform-petroleum ether (1:1), M.P. 88 to 89°.

EXAMPLE 2

6-amino-3-nitro-5H-benzocyclohepten-5-one

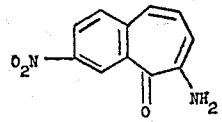

Following the procedure described in Example 1, but using an equivalent amount of 6-hydroxy-3-nitro-5H-benzocyclohepten-5-one in place of the 6-hydroxy-5H-benzocyclohepten-5-one, there is obtained 6-amino-3-nitro-5H-benzocyclohepten-5-one.

EXAMPLE 3

6-amino-2,3,4-trimethoxy-5H-benzocyclohepten-5-one

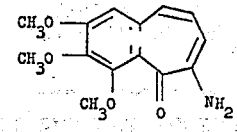

11.1 g. of purpurogallin-tetramethyl ether and 55 g. of ammonium acetate (both finely divided) are intimately admixed and heated to about 200° (resulting in a molten mass), and maintained at such temperature for 2 hours. The reaction mixture is then cooled and the reaction mixture worked up as described in Example 1 yielding as the residue a mixture of the title compound and purpurogallin-trimethyl ether. The 6-amino-2,3,4-trimethoxy-5H-benzocyclohepten-5-one is recovered, as an amorphous mass, from the residue (mixture) by chromatographing on a silica gel column using chloroform-methanol mixtures for elution.

The 6-amino-2,3,4-trimethoxy-5H-benzocyclohepten-5-one thus recovered is triturated with 3 N hydrogen chloride-isopropanol solution to obtain the hydrogen chloride salt thereof, M.P. 100 to 120° (dec.).

EXAMPLE 4

Following the procedure described in Example 1 but using an equivalent amount of compound II in place of the 6-hydroxy-5H-benzocyclohepten-5-one used therein, and using an equivalent amount of compound III in place of the ammonium acetate used therein, there is obtained the product I, which may be recovered in the manner described in Example 1 as listed below:

| | II | III | I |
|---|---|---|---|
| A | 3-chloro-6-hydroxy-5H-benzocyclohepten-5-one. | Methylammonium acetate. | 3-chloro-6-methylamino-5H-benzocyclohepten-5-one. |
| B | 1-chloro-6-hydroxy-5H-benzocyclohepten-5-one. | Dimethylammonium acetate. | 1-chloro-6-dimethylamino-5H-benzocyclohepten-5-one. |
| C | 3-acetamido-6-hydroxy-5H-benzocyclohepten-5-one. | Ammonium acetate | 3-acetamido-6-amino-5H-benzocyclohepten-5-one. |
| D | 3-dimethylamino-6-hydroxy-5H-benzocyclohepten-5-one. | ....do.................... | 6-amino-3-dimethyl-5H-benzocyclohepten-5-one. |

EXAMPLE 5

6-amino-2,3-dimethoxy-5H-benzocyclohepten-5-one

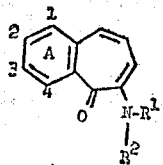

Following the procedure described in Example 3, but using an equivalent amount of 2,3,6-trimethoxy-5H-benzocyclohepten-5-one in place of the purpurogallin tetramethyl ether used therein, there is obtained 6-amino-2,3-dimethoxy-5H-benzocyclohepten-5-one.

What is claimed is:

1. A compound which is a benzocycloheptenone derivative of the formula wherein each of
R¹ and R² is, independently, a hydrogen atom or lower alkyl; and
ring A is unsubstituted or is mono-substituted at the 1-position by a chlorine or bromine atom; at the 2-position by alkoxy having from 1 to 2 carbon atoms or at the 3-position by any of a chlorine or bromine atom; nitro or

di-substituted at the 2- and 3-positions by alkoxy having from 1 to 2 carbon atoms; or tri-substituted at the 2- and 3-positions by alkoxy having from 1 to 2 carbon atoms and at the 4-position by either alkoxy having from 1 to 2 carbon atoms or hydroxy, wherein
R³ is a hydrogen atom or lower alkyl; and
R⁴ is a hydrogen atom or lower alkyl;
or a non-toxic pharmaceutically acceptable acid addition salt thereof.

2. A compound of claim 1 wherein each of R¹ and R² is a hydrogen atom.

3. The compound of claim 2 which is 6-amino-5H-benzocyclohepten-5-one.

4. The compound of claim 2 which is 6-amino-2,3,4-trimethoxy-5H-benzocyclohepten-5-one.

References Cited
UNITED STATES PATENTS 3,408,399    10/1968    Galantay _____ 260—578 X
3,458,577    7/1969     Galantay _____ 260—574 X

OTHER REFERENCES

Wagner & Zook, Synthetic Organic Chemistry, John Wiley & Sons, Inc., New York, 1953, p. 670.

JOSEPH REBOLD, Primary Examiner

C. F. WARREN, Assistant Examiner

U.S. Cl. X.R.

260—562, 574, 577, 578; 424—324, 330

UNITED STATES PATENT OFFICE
CERTIFICATE OF CORRECTION

Patent No. 3,651,143     Dated March 21, 1972

Inventor(s) EUGENE E. GALANTAY

It is certified that error appears in the above-identified patent and that said Letters Patent are hereby corrected as shown below:

Column 1, line 3, delete the title and insert the following:

-- BENZOCYCLOHEPTENONES --

Column 3, line 24, delete "Alcohol SD-30, purified water, q.s." and insert the following:

-- Alcohol SD-30, purified water ----------q.s. --

Column 4, line 31, delete "M.P." and insert the following:

-- m.p. --

Column 4, table following line 40, line "D" Table I, delete "6-amino-3-dimethyl-5H-benzocyclohepten-5-one." and insert the following:

-- 6-amino-3-dimethylamino-5H-benzocyclohepten-5-one --

Signed and sealed this 19th day of November 1974.

(SEAL)
Attest:

McCOY M. GIBSON JR.
Attesting Officer

C. MARSHALL DANN
Commissioner of Patents